United States Patent [19]

Hawkins

[11] Patent Number: 4,680,424
[45] Date of Patent: Jul. 14, 1987

[54] OVERHEAD CONDUCTOR DAMPING DEVICE WITH DIE CAST COMPONENTS AND METHOD OF MAKING THE SAME

[75] Inventor: Ronald G. Hawkins, Massena, N.Y.

[73] Assignee: Aluminum Company of America, Pittsburgh, Pa.

[21] Appl. No.: 805,818

[22] Filed: Dec. 6, 1985

[51] Int. Cl.$^4$ ............................................. H02G 7/14
[52] U.S. Cl. ........................................ 174/42; 29/463;
29/464; 156/60; 156/292; 164/137; 188/379;
249/155; 425/577
[58] Field of Search .................. 174/42; 188/378, 379;
164/137, 187, 232, 240, 349, 361, 364, 436;
249/104, 155, 175, 102; 425/577; 156/60, 292

[56] References Cited

U.S. PATENT DOCUMENTS

| 4,303,221 | 12/1981 | Gallusser et al. | 249/175 X |
| 4,384,166 | 5/1983 | Nigol et al. | 174/42 |
| 4,385,201 | 5/1983 | Nigol et al. | 174/42 |
| 4,523,053 | 6/1985 | Rawlins | 174/42 |
| 4,527,008 | 7/1985 | Hawkins et al. | 174/42 |
| 4,554,402 | 11/1985 | Hawkins et al. | 174/42 |

FOREIGN PATENT DOCUMENTS 685503  1/1953  United Kingdom ................. 174/42

Primary Examiner—Laramie E. Askin
Attorney, Agent, or Firm—Elroy Strickland

[57] ABSTRACT

A device for damping vibrations of an overhead conductor comprises a die cast weight and housing comprised of opposed weight and housing halves located on opposed sides of a clamp arm and having spherical outer surfaces to minimize corona and tooling costs. The clamp arm is located between two tubular elastomer damping elements secured in place between the clamp arm and the weight and housing halves. The damping device, in addition, includes a pin that secures the weight and housing halves, clamp arm, and damping members together in a sandwich-like construction.

20 Claims, 9 Drawing Figures

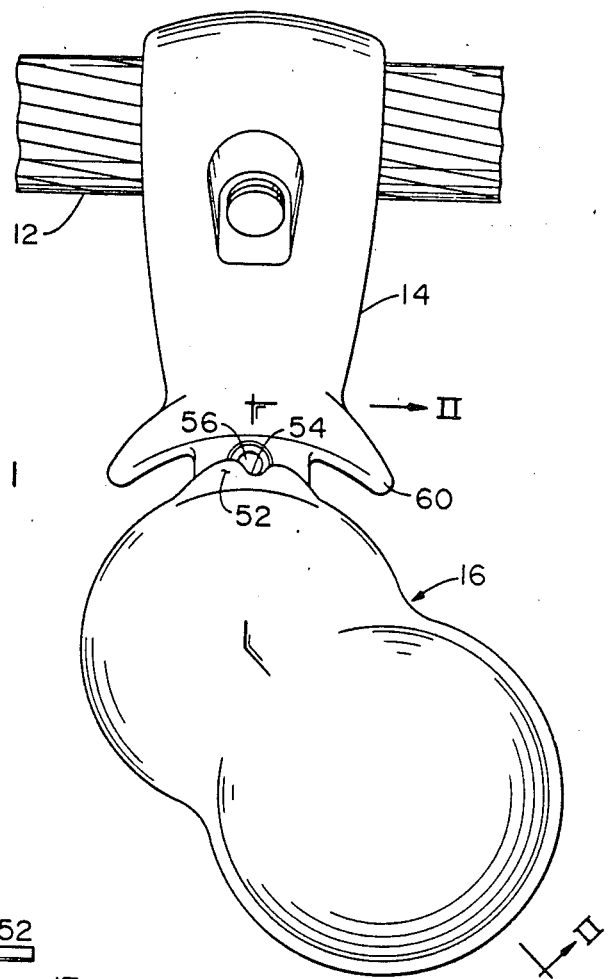
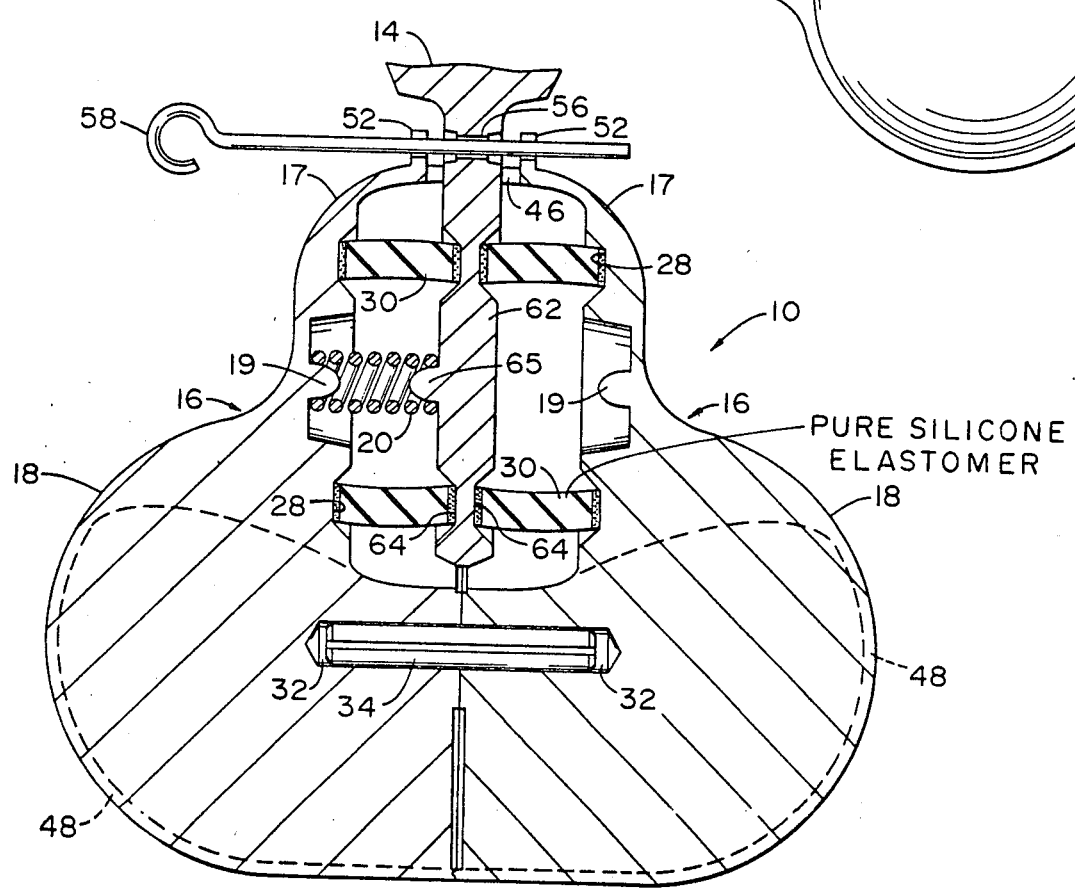
FIG. 1
FIG. 2

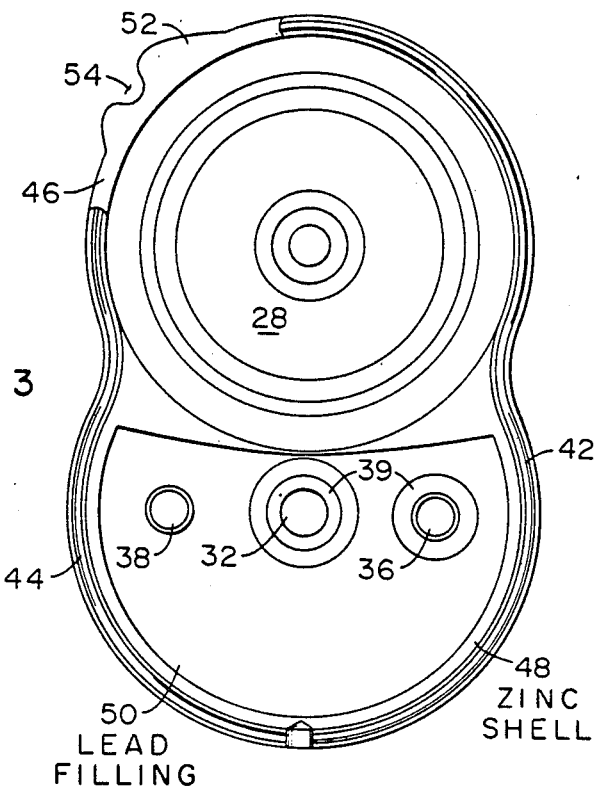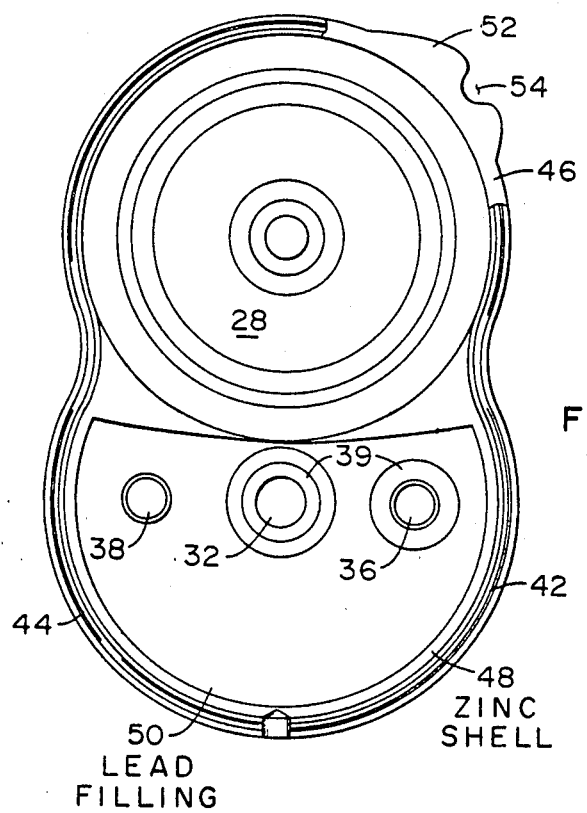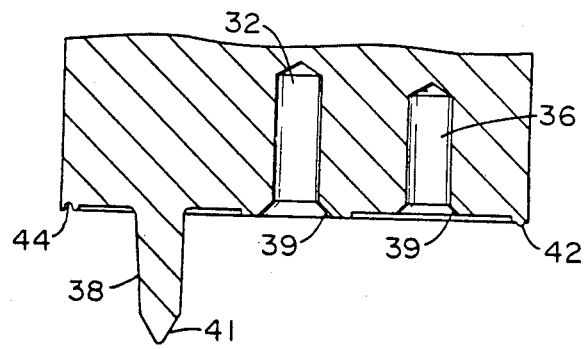

OVERHEAD CONDUCTOR DAMPING DEVICE WITH DIE CAST COMPONENTS AND METHOD OF MAKING THE SAME

BACKGROUND OF THE INVENTION

The present invention relates generally to damping devices for damping the vibration of overhead conductors, and particularly to a low-cost, corona-free damping device that takes the place of the well-known Stockbridge damper.

The inventor of the present disclosure is named in two previous patent applications directed to damping devices for overhead conductors that employ elastomer damping elements in a compact manner; namely, U.S. Ser. No. 565,180, filed Dec. 23, 1983 (now U.S. Pat. No. 4,527,008), and a continuation-in-part application thereof, U.S. Ser. No. 718,549, filed Apr. 1, 1985 (now U.S. Pat. No. 4,554,402). In addition, this application is being simultaneously filed with a second application by the inventor, the second application being entitled "Damper With Stamped and Sand-Cast Parts," U.S. Ser. No. 805,819 filed Dec. 6, 1985.

It is well known that manufacturing companies look for economies in manufacture and improvements in performance of their products to meet competition. In the case of damping devices employing inertial weights attached to overhead conductors, the weights and clamp arms thereof are usually die cast. The machines and die casting molds employed to die cast components are costly, and in the case of overhead dampers, which are required to dampen the vibration of a multitude of conductor sizes (diameters), the cost is substantial. For example, there are about 350 conductor sizes presently employed in the United States to transmit electrical energy. All of these conductors are subject to aeolian vibration, and hence all require damping devices in one form or another. The damping devices require 21 clamp sizes to clamp the devices to the conductors. It can be appreciated that if separate die tooling is required for each of the conductor sizes, the cost can be prohibitive.

To properly match the impedance of the existing commercial conductors to damping devices, six inertial weight sizes are required. In the case where each damper required two, opposed weight halves, separate die tooling for each half would double the above cost of the weights.

BRIEF SUMMARY OF THE INVENTION

The present invention is directed to a highly compact, low-cost damping device, and a method of making the same in which the inertial weight of the device is comprised of two substantially identical weight and housing halves structured in a manner that allows the use of one rounded die to cast both weight and housing halves. The housing portion of each die cast half is provided with a window that is offset from the vertical, when the damper of the invention is unattached to an overhead conductor, for accommodating the arm of a clamp of the device. Such windows can be easily and inexpensively provided by use of a single, spherical die and a die element that is simply relocated in the die when the first half is cast and before the second half is cast. Such a die element locates the windows at the proper angle so that when the halves are assembled together, the windows are located opposite of each other to provide an opening or window for accommodating the clamp arm.

The damping device of the invention includes further tubular damping members that are inexpensive to make and that otherwise provide the device with all the advantages recited hereinafter.

BRIEF DESCRIPTION OF THE DRAWINGS

The advantages and objectives of the invention will be best understood from consideration of the following detailed description, along with the accompanying drawings, in which:

FIG. 1 is an end elevation view of the damper of the invention;

FIG. 2 is a cross-sectional view of the damper of FIG. 1 taken along lines II—II of FIG. 1;

FIGS. 3 and 4 are, respectively, right and left-hand cast weight and housing halves of the invention;

FIG. 5 is a partial sectional view of one of the weight and housing halves showing certain details thereof;

FIGS. 8 and 9 are graphs of data comparing the damping performance of the subject damper with that of a Stockbridge damper.

PREFERRED EMBODIMENT OF THE INVENTION

Figure 6:
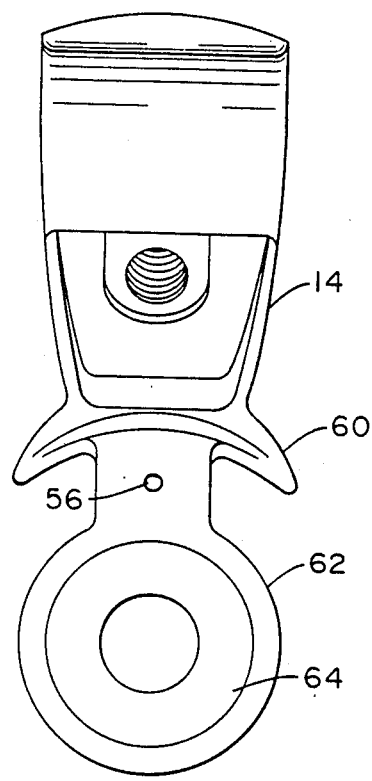
FIG. 6 is a side elevation view of a clamp arm of the invention.

Referring now to FIG. 1 of the drawings, the damping device of the invention, which is labeled generally by reference numeral 10, is shown in end elevation. The device includes and is attached to an overhead conductor 12 by a clamp arm 14 in a manner that supports integral housing and weight halves 16 beneath the conductor at an angle of about 45° with respect to the vertical. The axis of the inertial weight of the device is located perpendicular to the axis of conductor 12, and parallel to the ground and conductor.

Figure 7:
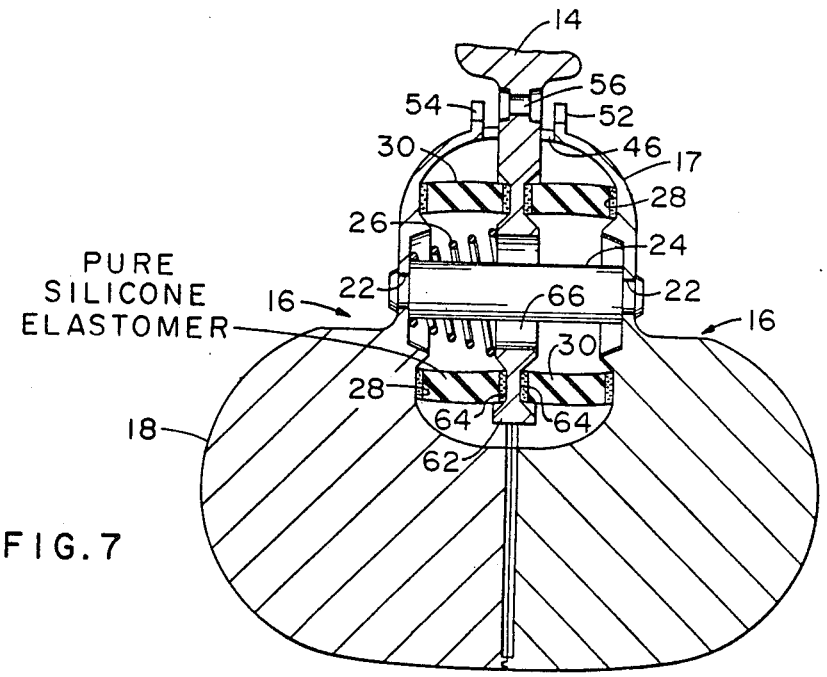
FIG. 7 is a sectional view of a second embodiment of the invention.

Referring now to FIG. 2 of the drawings, the structure of damper 10 includes two integral weight and housing halves 16 cast in a single die structure (not shown) having internal rounded spherical cavities that provide each housing and weight half with the outer spherical surfaces 17 and 18 shown in FIGS. 1, 2, and 7. Such surfaces reduce corona stress and eliminate corona discharge when the damper of the invention is subject to the high voltage stresses of overhead transmission lines.

Each weight and housing half 16 can be cast with a projection 19 as shown in FIG. 2, securing a coil spring 20 between one housing portion and clamp arm 14, or, in the case of the embodiment depicted in FIG. 7, the halves can be cast with openings 22 in place of projections 19. Openings 22 are used to receive the ends of a rivet pin 24 to secure a tapered coil spring 26 between one housing portion and the clamp arm. The purpose and particulars of springs 20 and 26 are explained hereinafter.

Weight and housing halves are further cast with cup-shaped seats 28 sized to fit the ends of thin-walled tubular elastomer members 30, as shown in FIGS. 2 and 7. The ends of the elastomer members and the inside bottom surfaces of seats 28 are flat (planar) such that the elastomer members and housing portions are easily and permanently bonded together in a manner explained below. Further, the outside diameters of members 30 are preferably greater than their lengths so that they are structurally stable, and their ends present uniform bearing surfaces for effective bonding to the walls and clamp arm of the damper.

The weight portion of each integral half is further provided with a central recess 32 (FIG. 2) for receiving a roll pin 34 (FIG. 2) that secures the weight and housing halves together about elastomer members 30 and clamp arm 14. The diameters of recesses 32 are sized with respect to the diameter of the roll pin such that the roll pin is squeezed in the recesses when the weight and housing halves are brought together in assembling the damper.

A further recess 36 (FIG. 5) is cast in each half 16 and dimensioned to receive an integral, cast dowel pin 38 (FIG. 5). As seen in FIG. 5, both recesses 32 and 36 can be cast with beveled openings 39, and dowel 38 provided with a tapered end 41. The purpose of beveled entrances 39 and tapered ends 41 is to guide the two halves 16 together in the process of assembling damper 10, as the workman assembling the damper cannot readily see the recesses for receiving the roll pin. Hence, dowels 38 are formed on the inward faces of weight and housing halves 16 in a manner that locates the dowels opposite the recesses 36 in the weight and housing halves. The locations of the dowels and their corresponding recesses in relation to the recesses 32, for receiving roll pin 34, are such that recesses 32 are aligned when the dowels and their recesses are aligned. This aligns the roll pin, after it is inserted into the opening 32 of one of the halves, with the opening 32 of the other half.

The weight and housing halves are further cast with a peripheral tongue 42 and a groove 44. As seen in the views of FIGS. 3, 4, and 5, tongue 42 is located on the right-hand edge of the weight and housing half, 42 extending from the lower center of the weight portion to an upper location that terminates at one edge of a window or opening half 46 provided in the upper portion of each housing portion. The window halves form a window (46 in FIGS. 2 and 7) that accommodates clamp arm 14 when the weight and housing halves are brought together in the manner shown in FIGS. 2 and 7.

Similarly, groove 44 begins at the lower dead center of the weight portion and extends along the left-hand edge of the half to terminate at an upper location of window 46 opposite the termination of tongue 42.

The locations of the tongues and grooves of the two weight and housing halves in FIGS. 3 and 4 are the same since these figures show in elevation the inside surfaces of the halves. However, in assembling damper 10, one of the halves is rotated about its vertical axis to face the other half, which places the grooves of the halves opposite the tongues of the halves. The tongues and grooves are sized to fit tightly together so that when firmly seated together, serve to seal the interior abutting surfaces of the halves against the entry of moisture and water. In freezing climates, it is important to keep moisture and water from abutting surfaces to prevent freezing of such moisture or water. Such freezing results in the formation of ice between the surfaces, which ice can expand and thereby force the weight and housing halves apart.

The tongues and grooves 42 and 44 of halves 16 also provide means to align the halves in the process of assembling the components of the damper together.

The angular location of the window halves 46 in each weight and housing half 16, with respect to the vertical, is such that the window halves will be located opposite each other when the weight and housing halves are brought about clamp arm 12 and elastomer members 30. When the damper of the invention is attached to an overhead conductor 12, the window and clamp arm will be facing in an upward vertical direction, with the housing and weight structure disposed at the approximate 45° angle shown in FIG. 1.

An objective of the invention is to produce dampers at minimum cost. Since window halves 46 are located at about 45° and 315°, respectively to the vertical (see FIGS. 3 and 4), two die casting molds would ordinarily be required to provide the clamp arm window of the assembled damper. However, by using a single die element (not shown) sized to the desired dimension of each window half 46, which halves are otherwise identical, the workman simply locates the die element at a location in the die when casting one weight and housing half 16 that forms the window half at say the 45° angle of FIG. 3, and then moves the die element to a 315° location in the die to provide the window half of FIG. 4 when the second weight and housing half is cast. In this manner, a single die can be employed in making both halves of damper 10, thereby cutting in half the cost of die machinery that would ordinarily be required. In addition, ball end mills are numerous and commercially available that sink spherical dies at relatively low cost such that the cost of making the die employed in making the shapes of 16 is relatively low.

The material of halves 16 is a heavy metal to provide the necessary inertia for operation of the damper. A preferred metal is zinc, as it is easily cast with critical tolerances and a smooth corona-free surface and finish. Lead, for example, does not have such capabilities and qualities. However, the cost of zinc is presently fifty-eight cents per pound, whereas lead is only twenty-two cents per pound. Hence, the halves 16 of the subject damper can be made by casting a hollow zinc shell 48 and filling the same with the less costly lead 50. The zinc shell, however, includes the portions for housing elastomers 30 and spring 20, which maintains the close tolerances necessary for proper compression of, and therefore effective damping by, the elastomers. The hollow shell and lead filling thus are located in the area of the inertial weight of the damper.

Bordering the edge of the window halves 46 cast in the upper portion of each housing portion is an outwardly extending flange 52. In each flange is provided a slot 54. Each slot 54 is centered (when the damper is properly assembled) on a hole 56 provided in clamp arm 14. The purpose of hole 56 and slots 54 is to receive a pull pin 58 when the damper is being assembled, as described in detail hereinafter.

Clamp arm 14 is preferably made by casting in a sand mold, and is provided with a skirt 60 that covers window 46 of the housing portion of the damper. Skirt 60 shields the interior of the housing portion from harmful radiation from the sun and thereby protects elastomer members 30.

The lower end of clamp arm 14 is provided with an enlarged circular extension 62, as best seen in FIG. 6 of the drawings, the opposed faces of circular extension 62 each having an annular cup-shaped recess and planar surface 64. The outside diameter of 62 is larger than opening 46 in the damper housing portion such that with any failure on the part of elastomers 30, the weight and housing halves will remain attached to conductor 12 and not fall on the ground. In the case of the FIG. 2 embodiment, clamp arm 12 is provided with a protrusion 65 for receiving the end of coil spring 20 opposite the end disposed on protrusion 19. In the case of the FIG. 7 embodiment, the center portion of extension 62 is provided with an opening 66 to accommodate rivet pin 24.

In assembling damper 10, roll pin 34 is secured in opening 32 of one weight and housing half 16, and a layer of adhesive material applied to the annular seat 28 of the weight and housing half. One end of one of the elastomer members 30 is then seated in the adhesive. Spring 20 can now be disposed in the elastomer member, or in the second one to be located in the housing portion of 16 and on projection 19 of the housing portion. (In the embodiment of FIG. 7, spring 26 is inserted in the elastomer member, and rivet pin 24 is disposed in the center of the spring, in the assembly process.) A layer of adhesive material is now applied to one of the annular planar surfaces and seats 64 of clamp arm extension 62, and the clamp surface (with the adhesive) disposed against the other end of the elastomer member. A layer of adhesive is next applied to the other face and surface 64 of the clamp extension, and one end of the second elastomer member 30 disposed in the adhesive layer. A final layer of adhesive is now applied to seat 28 of the other half 16 of the damper, and opening 32 therein aligned with the roll pin secured in the other half. The alignment is effected by the pointed ends 41 of integral dowels 38 (FIG. 5) directed toward beveled recesses 36 provided in the weight and housing halves opposite the dowels. The halves are moved together until the exposed end of the second elastomer 30 seats in the adhesive layer provided in seat 28 of the second weight and housing half. With the final closing of the weight and housing halves together, elastomers 30 press into the adhesive layers, as the elastomers are longer than the distances between seats 28 and 64, and roll pin 34 is squeezed in recess 32 of the other weight and housing half and is thereby firmly secured in the weight and housing halves, the dowels are seated in their opposed recesses, and the tongue and grooves 42 and 44 of the weight and housing halves are seated together. The roll pin is, hence, completely enclosed and sealed from the elements outside of the damper to ensure long-lasting retention of weight and housing halves together.

When the components of damper 10 are assembled in the manner just described, the adhesive material is wet and, hence, does not provide friction to prevent relative rotation of the clamp arm and housing portions. Therefore, to maintain the clamp arm in the approximate rotational center of window 46, the opening 56 in arm 14 is aligned with the slots 54 provided in flanges 52 of the housing portions, after the damper components are assembled, and pull pin 58 inserted through slots 54 and opening 56. This fixes rotationally the clamp arm in window 46 while the adhesive material dries. When the material is dry, it hardens to the extent that the clamp arm is rotationally fixed in position, and pin 58 is now removed from the damper.

The center positioning effected by the pull pin locates the clamp arm in a slightly off-center position in window 46, and the housing and weight halves 16 at an angle of about 46.5° with respect to the vertical. When the damper is clamped to an overhead conductor, the mass of weight and housing halves torsionally shears the elastomers 30 slightly such that the weight and housing halves rotate to the near perfect 45° angle shown in FIG. 1.

As seen in FIGS. 2 and 7 of the drawings, with the halves 16 properly secured together, the elastomer members 30 are compressed slightly such that their walls bulge in an outward direction i.e., the uncompressed length of the members 30 is longer than the distance between clamp arm surface 64 and the inside surface 28 of each housing portion. This bulge is particularly advantageous, as the diameters of 30 are increased at the location of maximum strain on 30 when vibration of the conductor occurs; this ensures long life of the elastomer members.

Other advantages flow from the use of hollow thin-wall elastomers bonded to the damper housing portions and clamp arm in the manner described above. The cylindrical shape of the elastomer members with their planar ends presents structurally stable shapes that make the above bonding process effective in that the shapes are not easily peeled from the surfaces of the clamp arm and housing portions.

With the bonding of the elastomers to the clamp arm and housing portions, no surfaces are available for sliding movement against each other; in this manner no occasion is provided for frictional abrasive wear. This is particularly important in areas subject to sand storms. With vibration of the conductor (12) to which the damper is attached, relative movement between the clamp arm and weight and housing halves is through flexing (working) of the elastomers. With such flexing, the energy of conductor vibration is transferred to the elastomer bodies which energy heats the bodies, the bodies dissipating the heat (energy) to the atmosphere.

Another advantage of the thin-walled elastomers is the substantial surface areas made available for radiation of heat generated in elastomers. At unusually high temperatures, the fatigue life of elastomer materials is shortened, and the materials tend to lose their resilience and spring constant. Hence, it is important for the damping function that such materials remain relatively cool.

A further advantage with bonding the hollow elastomers 30 to the clamp arm and housing portions is that ambient air is captured in the elastomers. The capture of air provides an air column in the center of the elastomer member to support its wall and thereby strengthen the member.

Yet another advantage of tubular elastomers is the ability of such components to serve as "tolerance eaters". When damper 10 is assembled, elastomers 30 are compressed such that the walls of the elastomers bulge outwardly with no change in wall thickness. In this manner, the damping capability of the damper is not affected when tolerances are off for the elastomers themselves, the depths of sockets 28 in the cast halves 16, and the thickness of the clamp arm between seats 64 (FIG. 2).

Preferably, the material of the elastomers is a substantially pure silicone, and the material of the adhesive (employed to bond the elastomers to the clamp arm and housing walls) a flexible silicone adhesive. The adhesive material should be flexible, as any rigid, hard material located adjacent the ends of the elastomer reduces the working lengths thereof such that, for damping purposes, the elastomers are shorter than their actual lengths. With the use of a flexible adhesive, such a problem does not occur. In addition, a flexible adhesive does not establish high stress points on elastomers 30 which, with the cyclic function of damping, will shorten the fatigue life of the elastomers.

An important advantage occurring with the use of silicone elastomers is the fact that such material is relatively soft across a wide range of ambient temperatures. In this manner, the torsional stiffness of the elastomer does not change substantially when outside temperatures fall to sub-zero levels.

For example, FIGS. 8 and 9 of the drawings are plots of test data that compare the damping efficiency (capability) of the subject damper at room temperature (70° F.) and at −30° F. to the damping efficiency capability of the well-known Stockbridge damper. A third curve is shown in FIGS. 8 and 9 representing the "fitted" performance curve of the subject damper. It will be observed that the 39.2 and 52% "fitted acceptance" of the damper of the invention is substantially greater than 26% for the Stockbridge damper.

The data of FIGS. 8 and 9 consist of the velocity (MPH) of air current moving across the conductor, listed on the ordinates of the graphs, and damping efficiency numbered along the abscissae. In addition, three vertical columns are shown on the right of each graph listing wind velocity and frequency, and damping efficiency of the damper of the invention at the listed velocity and frequency.

An important advantage of higher damping efficiency is the ability to dampen longer span lengths of conductors. In the case of the present damper being employed in a temperature environment of 70° F., the 39.2% efficiency can handle a span length 1.507 times greater than the 26% efficiency of the Stockbridge damper (39.2/26).

The line on which the tests were conducted to obtain the data was a 0.927-inch stranded ACSR conductor tensioned at 25.0% of its rated tensile strength (RTS). As can be appreciated, as temperature decreases, the tension of the conductor increases, resulting in a need to dissipate greater amounts of vibration energy. As seen in both presentations (FIGS. 8 and 9), the performance of the subject damper is substantially greater than the Stockbridge damper and consistently greater from warm (70° F.) to very cold (−30° F.) environments.

Another advantage flowing from the use of elastomers as damping mechanisms is the ability to match the damping of impedance of the damper to that of the conductor without the necessity of changing the metal components of the damper. A conductor strung at a certain tension offers a certain impedance to vibration when air currents move across the conductor. When a conductor is strung at a different tension, its impedance is changed.

The impedance of a conductor to vibration can be expressed in the following manner:

$$Z = \sqrt{(T)(M)}$$

where
T is the tension at which the conductor is strung; and
M is the mass of the conductor.
The reference impedance to vibration of a damper can be expressed as follows:

$$Z_r = \sqrt{(M)(K)}$$

where M is the mass of the inertial weights of the damper and K is the spring rate of the elastomer of the damper.

To match the impedance of the damper of the invention to that of a conductor to be damped having a known tension and mass, only elastomer material 30 of the damper need be changed or chosen such that it has the proper spring rate. The more costly metal components of the damper, i.e., the weights and clamp, remain the same. As noted earlier, there are 21 clamp sizes required for the many conductor diameters commercially employed and six different inertial weight sizes. To change these items for impedance-matching purposes is substantially more costly than changing the elastomer.

The resilience of coil spring 20 or 26 is such that it does not work against the damping function of elastomers 30. Rather, the spring constant of 20 or 26 is chosen such that the spring flexes easily and has a low stress characteristic that permits long fatigue life for the spring. Further, the spring is sealed within elastomer 30 such that it does not see outside weather which might tend to corrode the spring and the interfaces between the spring and damper components.

Because of the damping efficiency of damper 10, it is 47% lighter in weight and smaller in volume than the corresponding Stockbridge damper. The result of this is a significant savings in freight and warehouse costs for both the shipper and the customer (transmission line owner) and a significant increase in the span lengths that can be protected from vibration. This results in the reduction of the number of dampers needed in a given distance, providing (again) a savings for the customer.

While the invention has been described in terms of preferred embodiments, the claims appended hereto are intended to encompass all embodiments which fall within the spirit of the invention.

What is claimed is:

1. A device for damping vibrations of an overhead conductor, comprising:
    a clamp arm,
    a die cast weight and housing comprised of opposed weight and housing halves located on opposed sides of said clamp arm and having spherical outer surfaces to minimize corona and tooling costs,
    a window provided in the weight and housing for accommodating the clamp arm,
    said clamp arm extending through said window,
    tubular elastomer damping members located between and bonded to the clamp arm and weight and housing halves such that the damping members support the weight and housing halves on the clamp arm, and damping is effected by flexing of the damping members without occurrence of sliding movement between components of the damping device, and
    means securing the weight and housing halves, clamp arm and damping members together.

2. The damping device of claim 1 in which the window is comprised of a slot provided in each weight and housing half when the halves are cast.

3. The damping device of claim 1 in which the window and clamp arm are offset from the vertical such that the housing and weight halves are disposed at an angle to the vertical when the device is clamped to an overhead conductor.

4. The damping device of claim 1 in which the housing and weight halves are each provided with a tongue and groove means extending along peripheral portions of the halves, said tongue and groove means being disposed in mating relationship when the halves are assembled together.

5. The damping device of claim 1 in which the means securing the weight and housing halves, clamp arm and elastomer damping members together comprises:
   a roll pin,
   an aligned, wholly internal recess provided in each of the weight and housing halves,
   with said roll pin extending into and secured in the internal recesses, and being completely sealed from weather elements outside of the device.

6. The damping device of claim 5 in which the weight and housing halves are each provided respectively with a male dowel and matching female opening that serve to align the internal recesses for receiving the roll pin.

7. The damping device of claim 1 in which each weight and housing half is comprised of an outer shell of zinc, with each weight and housing half having an inner cavity filled with lead.

8. The damping device of claim 1 including a coil spring located in one of the damping members and extending between the clamp arm and a weight and housing half to electrically connect the two together, said spring being sealed from the weather outside the device by the weight and housing half and damping member.

9. The damping device of claim 8 in which the coil spring is made of a thin gauge spring wire that does not affect the damping effort of said damping members and has low stress when flexed such that the spring has a long fatigue life.

10. The damping device of claim 1 in which the elastomer damping members are made from a thin-walled, substantially pure silicone material.

11. The damping device of claim 1 in which the clamp arm and weight and housing halves are provided with cup-shaped depressions having bottom planar surfaces, and the elastomer damping members are cylindrical in shape and have planar ends abutting the planar surfaces of the depressions.

12. The damping device of claim 11 in which a layer of adhesive material is located between the ends of the elastomer damping members and the planar surfaces of the depressions provided in the clamp arm and weight and housing halves.

13. The damping device of claim 1 in which the window provided in the weight and housing is formed when the opposed halves are brought together to form the weight and housing, the edges of the halves defining the window being located about the clamp arm and providing means to limit relative motion between the clamp arm and weight and housing.

14. The damping device of claim 1 in which the clamp arm is provided with a flange or skirt structure that shields the window from sunlight.

15. The damping device of claim 1 in which the width of the weight and housing is sized relative to the length of the elastomer damping members to compress the same in the weight and housing such that the walls of the members bulge outwardly at a location adjacent the longitudinal centers thereof.

16. The damping device of claim 1 in which the damping members are hollow, and air is captured therein when the weight and housing halves and clamp arm engage and are pressed against the ends thereof.

17. The damping device of claim 1 in which the damping members have outside diameters that are greater than the lengths thereof such that they are structurally stable, and the ends thereof present uniform bearing surfaces and pressures against the walls of the weight and housing halves when assembled together.

18. The damping device of claim 1 including a removable pin for holding the clamp arm and weight and housing halves at predetermined angular positions, with the weight and housing halves being provided with a peripheral slot for receiving the removable pin.

19. A method of making a device for damping the vibrations of overhead electrical conductors, said method comprising the steps of:
   providing hollow cylindrical-shaped elastomer damping members, said damping members having parallel planar ends,
   providing parallel planar surfaces on opposed walls of a housing structure for housing the damping members and on opposed surfaces of a clamp arm for clamping to an overhead conductor,
   applying a layer of substantially wet flexible adhesive to the planar surfaces of the housing structure and clamp arm,
   locating the damping members between the planar surfaces of the housing structure and clamp arm in a manner that seats the ends of the damping members in the flexible adhesive, and
   joining the ends of the damping members to the clamp arm and housing structure by pressing the ends against the layers of adhesive and allowing the adhesive to dry.

20. The method of claim 19 including the step of preventing relative movement of the clamp arm and housing structure until the adhesive dries.

* * * * *